(12) United States Patent
Eickhoff et al.

(10) Patent No.: US 7,901,816 B2
(45) Date of Patent: Mar. 8, 2011

(54) WATER RECLAMATION IN A MICROPOWER GENERATOR

(75) Inventors: Steven J. Eickhoff, Plymouth, MN (US); Roland A. Wood, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1276 days.

(21) Appl. No.: 11/270,848

(22) Filed: Nov. 9, 2005

(65) Prior Publication Data

US 2007/0104996 A1   May 10, 2007

(51) Int. Cl.
*H01M 8/06* (2006.01)

(52) U.S. Cl. ......... 429/414; 429/408; 429/413; 429/415; 429/417; 429/420; 429/450

(58) Field of Classification Search ............ 429/19, 429/17, 34, 408, 413, 414, 415, 417, 420, 429/450
See application file for complete search history.

(56) References Cited

U.S. PATENT DOCUMENTS

| | | | |
|---|---|---|---|
| 4,155,712 A | 5/1979 | Taschek | 422/239 |
| 4,261,955 A | 4/1981 | Bailey, Jr. et al. | 422/239 |
| 5,372,617 A | 12/1994 | Kerrebrock et al. | 48/61 |
| 6,093,501 A | 7/2000 | Werth | 429/17 |
| 6,432,566 B1 | 8/2002 | Condit et al. | 429/17 |
| 2003/0003341 A1 | 1/2003 | Kinkelaar et al. | |
| 2003/0215686 A1* | 11/2003 | DeFilippis et al. | 429/34 |
| 2003/0228252 A1 | 12/2003 | Shurtleff | |
| 2004/0161646 A1* | 8/2004 | Rezachek et al. | 429/19 |
| 2004/0229098 A1 | 11/2004 | Fujita | |
| 2005/0024836 A1 | 2/2005 | Jansen | |
| 2005/0058882 A1 | 3/2005 | Meiklyar et al. | |
| 2005/0238573 A1* | 10/2005 | Zhang et al. | 423/648.1 |
| 2009/0214904 A1 | 8/2009 | Zhou | |

FOREIGN PATENT DOCUMENTS

WO  WO-2004075375 A2  9/2004
WO  WO-2006091227 A1  8/2006

OTHER PUBLICATIONS

"Application Serial No. 06824808.7, Office Action received mailed Jul. 1, 2009", 3.

* cited by examiner

*Primary Examiner* — Patrick Ryan
*Assistant Examiner* — Ben Lewis

(57) ABSTRACT

A waterless power generator, particularly a waterless electrical power generator and a passively controlled process for producing electricity with a fuel cell using stoichiometric amounts of a solid hydrogen fuel and byproduct water vapor produced by the fuel cell to generate hydrogen gas. A fuel cell reaction of hydrogen and oxygen produces electrical energy as well as by-product water which diffuses back into the power generator as water vapor to react with the hydrogen fuel, producing more hydrogen gas. This generated hydrogen gas is then used as a fuel which allows the fuel cell to generate additional electrical power and additional water. The process runs without any attached water source or water supply other than the water which is produced by the fuel cells themselves.

35 Claims, 5 Drawing Sheets

WATER RECLAMATION IN A MICROPOWER GENERATOR

STATEMENT OF GOVERNMENT INTEREST

The U.S. Government has a paid-up license in this invention and the right in limited circumstances to require the patent owner to license others on reasonable terms as provided for by the terms of Contract No. F33615-01-C-2171 awarded by AFRL Wright Research Lab.

BACKGROUND OF THE INVENTION

1. Field of the Invention

The invention relates to a waterless power generator. More particularly, the invention pertains to an electrical power generator and process for producing electrical power with a fuel cell. The reaction of oxygen and hydrogen gases in a fuel cell produces electricity and by-product water, which by-product water is reclaimed and used to produce additional hydrogen gas through its reaction with a solid hydrogen producing fuel.

2. Description of the Related Art

Similar to batteries, fuel cells function to produce electricity through chemical reactions. Rather than storing reactants as batteries do, fuel cells are operated by continuously supplying reactants to the cell. In a typical fuel cell, hydrogen gas acts as one reactant and oxygen as the other, with the two reacting at electrodes to form water molecules and releasing energy in the form of direct current electricity. This direct current electricity may then be converted into an alternating current. The apparatus and process may produce electricity continuously as long as hydrogen and oxygen are provided. While oxygen may either be stored or provided from the air, it is generally necessary to generate hydrogen gas from other compounds through controlled chemical reactions rather than storing hydrogen, because storing hydrogen gas requires that it either be compressed or cryogenically cooled. As fuel cell technology evolves, so do the means by which hydrogen gas is generated for application with fuel cells.

Currently, there are various methods which are known and employed for generating hydrogen gas. One method is by a process known as reformation in which fossil fuels are broken down into their hydrogen and carbon products. However, this system is undesirable in the long term because it is dependent upon a non-renewable resource. Another means of generating hydrogen gas is by reversibly adsorbing and releasing hydrogen gas from metal hydrides or alloys through heating. While this method is useful, it is not preferred because the metal hydrides are typically very heavy, expensive and only release small quantities of hydrogen. Yet another means by which hydrogen gas is generated is through reactive chemical hydrides. This process involves chemically generating hydrogen gas from dry, highly reactive solids by reacting them with liquid water or acids. Chemicals especially suitable for this process are lithium hydride, calcium hydride, lithium aluminum hydride, sodium borohydride and combinations thereof, each of which is capable of releasing plentiful quantities of hydrogen. The disadvantages associated with this method is that reaction products from the chemical and liquid water typically form a cake or pasty substance which interferes with further reaction of the reactive chemical with the liquid water or acid. This method is also disadvantageous in that the storage of liquid water fuel consumes additional space and increases the overall weight of the associated power generator.

There is currently a need in the art for lighter weight and smaller sized power sources for applications such as portable electronic devices, wireless sensors, battlefield applications, and unmanned air vehicles. Presently, the power source that is most often used for portable applications is the lithium battery, which has a limited energy capacity as a function of volume and especially as a function of weight. It is desirable to increase the energy capacity of current power sources so as to decrease the power supply replacement interval and/or increase operating life, while also reducing the size and weight of the power source.

The present invention provides a solution to these problems. The invention provides an electrical power generator and a process for generating hydrogen gas for fueling a fuel cell. The electrical power generator comprises a waterless generator, utilizing only by-product water from a fuel cell as a water vapor fuel source and without the need for externally supplied water. More particularly, the invention provides an electrical power generator that consumes stoichiometric amounts of water vapor and substantially solid, non-liquid chemical hydride. The fuel cell is preferably initially loaded with a hydrogen gas to initiate a reaction at a hydrogen-oxygen Proton Exchange Membrane (PEM) fuel cell between the hydrogen gas and oxygen gas. This reaction produces water molecules which are maintained within the generator housing at a water retention zone that deters the diffusion of generated fuel cell water out of the housing. The water molecules then diffuse back into the power generator in the form of water vapor, which water vapor is then reacted with the chemical hydride to produce more hydrogen gas. This generated hydrogen gas is then used as a fuel which allows the fuel cell to generate additional electrical power and additional water. By reclaiming and recycling this by-product water, the need for stored water is eliminated, thereby reducing the overall size and weight of the system, as well as increasing the energy density, specific energy and current capacity of the system. Further, by reacting water vapor with the aforementioned solid chemical substance, it has been found that the typical problems associated with reactive chemical hydrides are avoided, resulting in a more efficient system than those of the prior art that use liquid water.

The electrical power generator of the invention further exemplifies the unique capability of generating electrical power through a passive process, without the need for using pumps or other means of active regulation. It has been unexpected found that the solid chemical fuel inside the power generator creates a region of low humidity hydrogen on the anode side of a PEM fuel cell. The air on the cathode side of the fuel cell is of significantly higher humidity, due to normal ambient air conditions and due to the water produced at the fuel cell cathode by the electrochemical reaction between hydrogen and oxygen. This establishes a concentration gradient which causes water to permeate as water vapor from the more humid cathode side of the fuel cell to the lower humidity hydrogen on the anode side inside the generator cavity to create an equilibrium. Regulation of the hydrogen generation rate is partly self-regulating, because the reaction between hydrogen gas and oxygen gas at the fuel cell produces the required water corresponding to the electrical power generated. A pneumatically controlled valve may further be used to passively adjust the conductance of the water vapor path to the solid fuel.

SUMMARY OF THE INVENTION

The invention provides an electrical power generator comprising:
a) a housing;

b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas;

c) at least one fuel chamber mounted within the housing, which fuel chamber contains a fuel substance which reacts with water vapor to generate hydrogen gas;

d) at least one air inlet for admitting atmospheric air into the housing;

e) a water retention zone within the housing extending from the air inlet to the fuel cell cathode, which water retention zone deters the diffusion of generated fuel cell water out of the air inlet; and f) a cavity within the housing extending from the fuel cell to the fuel chamber, which admits a flow of hydrogen gas from the fuel chamber to the fuel cell, and which admits a flow of water vapor from the fuel cell to the fuel chamber.

The invention also provides an electrical power generator comprising:

a) a housing;

b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas;

c) at least one fuel chamber mounted within the housing, which fuel chamber contains a fuel substance which reacts with water vapor to generate hydrogen gas;

d) at least one air inlet for admitting atmospheric air into the housing;

e) a water retention zone within the housing extending from the air inlet to the fuel cell cathode, which water retention zone deters the diffusion of generated fuel cell water out of the air inlet;

f) a cavity within the housing extending from the fuel cell to the fuel chamber, which admits a flow of hydrogen gas from the fuel chamber to the fuel cell, and which admits a flow of water vapor from the fuel cell to the fuel chamber;

g) at least one valve positioned within said cavity for regulating the passage of hydrogen gas from the fuel chamber to the fuel cell, and for regulating the passage of water vapor from the fuel cell to the fuel chamber;

h) an oxygen permeable, water vapor impermeable membrane united with the air inlet, which membrane deters the flow of fuel cell water into the atmosphere; and i) a water permeable, hydrogen impermeable membrane within the cavity and juxtaposed with said valve, which water permeable, hydrogen impermeable membrane allows the diffusion of water vapor to said fuel chamber without passing the water vapor through said electrolytic membrane.

The invention further provides a process for producing electrical power comprising:

I) providing an electrical power generator which comprises:
  a) a housing;
  b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas;
  c) at least one fuel chamber mounted within the housing, which fuel chamber contains a fuel substance which reacts with water vapor to generate hydrogen gas;
  d) at least one air inlet for admitting atmospheric air into the housing;
  e) a water retention zone within the housing extending from the air inlet to the fuel cell cathode, which water retention zone deters the diffusion of generated fuel cell water out of the air inlet; and
  f) a cavity within the housing extending from the fuel cell to the fuel chamber, which admits a flow of hydrogen gas from the fuel chamber to the fuel cell, and which admits a flow of water vapor from the fuel cell to the fuel chamber; and II) operating said power generator to generate electricity by:
  a) reacting hydrogen gas and atmospheric oxygen gas in the fuel cell, thereby generating fuel cell water and electricity, which fuel cell water is retained in the water retention zone;
  b) diffusing said fuel cell water from the water retention zone, through the electrolytic membrane, into the cavity and to the at least one fuel chamber;
  c) reacting the water vapor with the fuel substance to generate hydrogen gas; and
  d) diffusing the generated hydrogen gas through the cavity and to the fuel cell.

DETAILED DESCRIPTION OF THE INVENTION

An electrical power generator is provided which generates hydrogen gas internally through the reaction of water vapor with a moisture absorbing, solid fuel substance, which hydrogen gas is reacted with atmospheric oxygen from the air at a fuel cell to generate electrical energy. The reaction of hydrogen and oxygen also produces water molecules as a byproduct at the fuel cell. This generated water is passively diffused from the fuel cell as water vapor to a fuel chamber that contains the solid fuel substance, where it reacts with the fuel substance to generate hydrogen gas. The electrical energy generated may be used to power large or small devices that are connected to the power generator, depending on the size of the power generator. The power generator of the invention is particularly useful for powering miniature devices such as wireless sensors, cellular phones or other hand held electronic devices that are electrically connected to the anode and cathode of the one or more fuel cells of the power generator.

Figure 1:
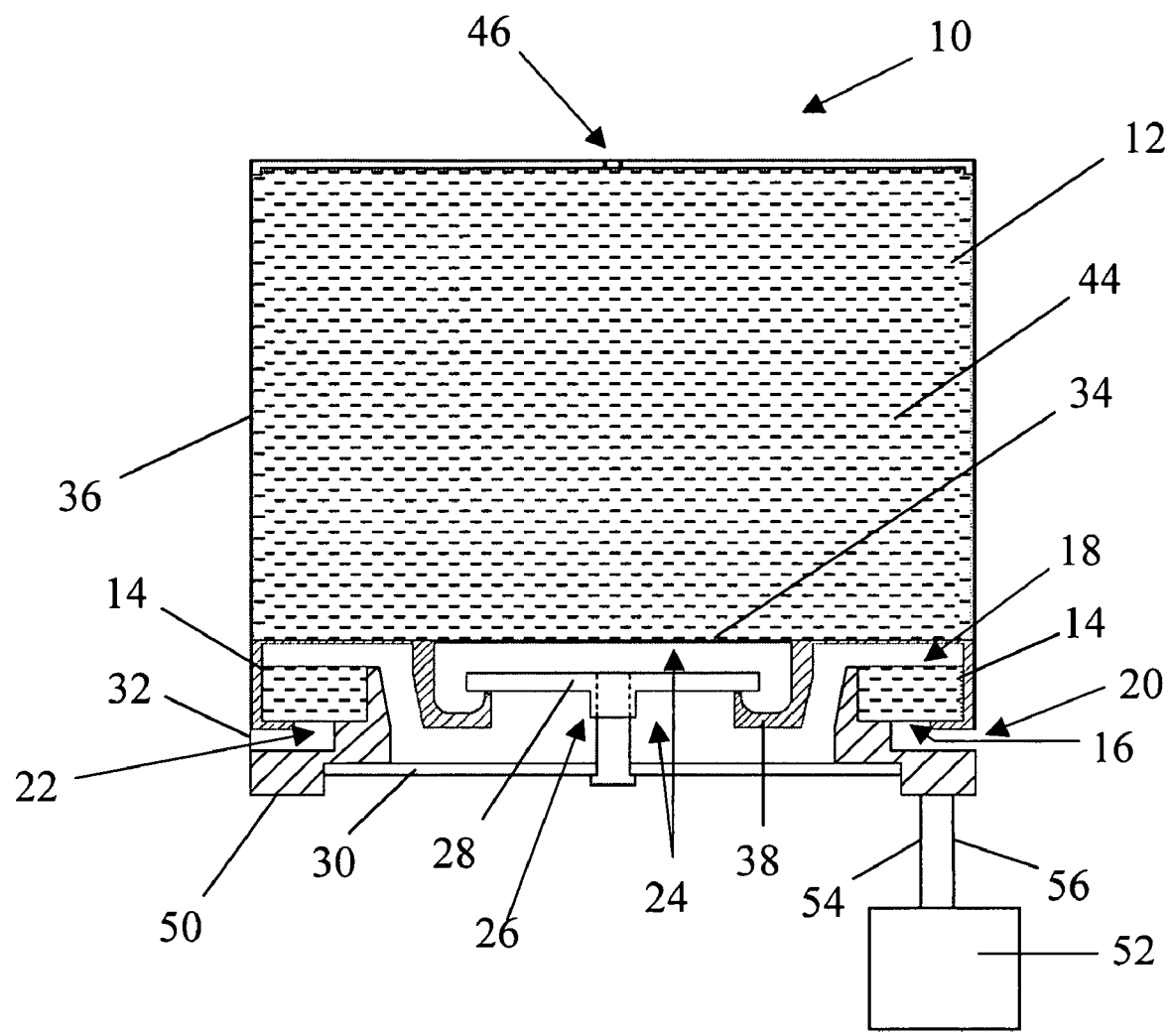
FIG. 1 is a cross-sectional schematic representation of a power generator of the invention without an oxygen permeable, water vapor impermeable membrane united with an air inlet of the generator.
Figure 2:
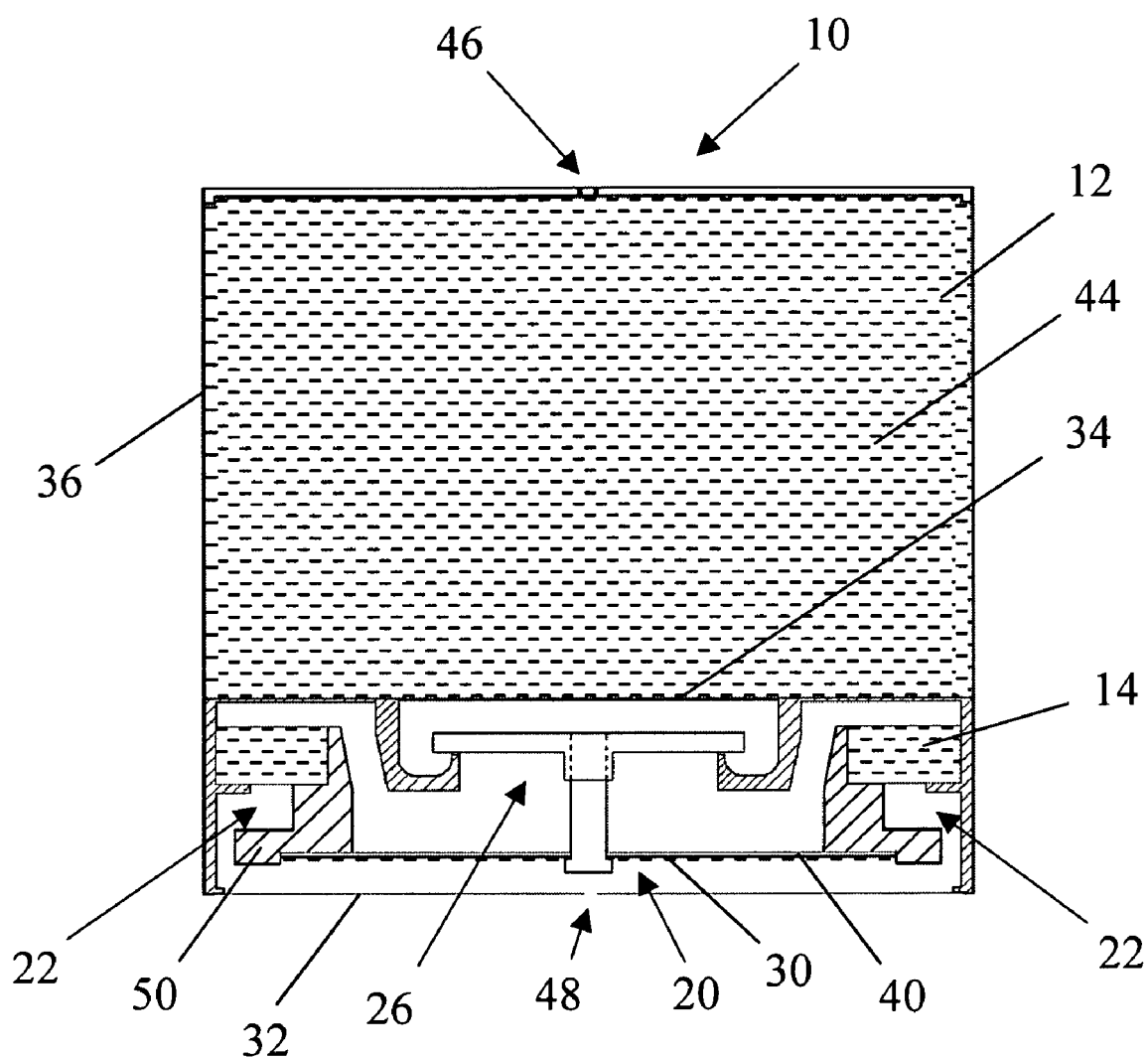
FIG. 2 is a cross-sectional schematic representation of a power generator of the invention having an oxygen permeable, water vapor impermeable membrane united with an air inlet of the generator.

FIGS. 1 and 2 illustrate cross-sectional views of alternate power generator apparatuses for carrying out the process of the invention. As seen in FIG. 1 and FIG. 2, an electrical power generator 10 comprises a housing 36, at least one fuel cell 14 mounted within the housing 36, at least one fuel chamber 12 for storing a fuel substance 44 mounted with the housing 36, and a cavity 24 within the housing 36 extending from the at least one fuel cell 14 to the fuel chamber 12. Cavity 24 admits a flow of hydrogen gas from the fuel chamber 12 to the fuel cell 14, and admits a flow of water vapor from the fuel cell 14 to the fuel chamber 12. Fuel cell 14 generates electricity and fuel cell water from the reaction of hydrogen gas and oxygen gas from the air. Atmospheric oxygen enters into the housing 36 through at least one air inlet 20. The oxygen gas then travels to the fuel cell 14 where it reacts with hydrogen gas, generating electricity and water molecules. The type of fuel cell used herein is well known in the art and is referred to in the art as a Proton Exchange Membrane (PEM) fuel cell, also known as a Polymer Electrolyte Membrane.

Figure 4:
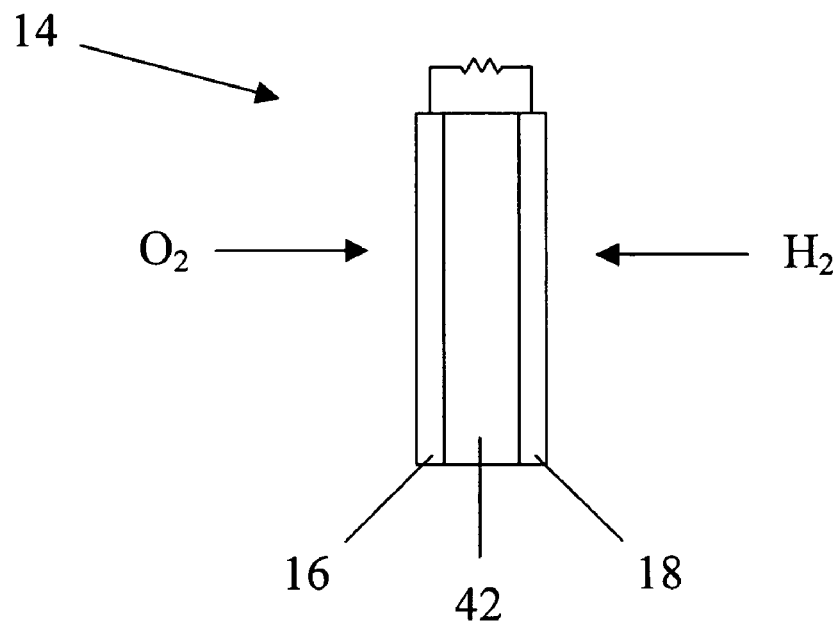
FIG. 4 is a schematic representation of a fuel cell.

As seen in FIG. 4, a typical PEM fuel cell comprises an electrolytic membrane 42 positioned between a negatively charged electrode, or cathode 16, on one side of the membrane, and a positively charged electrode, or anode 18, on the other side of the membrane. In typical hydrogen-oxygen PEM fuel cell behavior, a hydrogen fuel (e.g. hydrogen gas) is channeled through flow field plates to the anode, while oxygen is channeled to the cathode of the fuel cell. At the anode, the hydrogen is split into positive hydrogen ions (protons) and negatively charged electrons. The electrolytic membrane allows only the positively charged ions to pass through it to the cathode. The negatively charged electrons must instead travel along an external circuit to the cathode, creating an electrical current. At the cathode, the electrons and positively charged hydrogen ions combine with oxygen to form water molecules.

Inside the generator, on the anode 18 side of the fuel cell, an initial flush of hydrogen gas is preferably provided to remove residual air from within the power generator. This initial flush of hydrogen gas serves a dual purpose, as it will also react with atmospheric oxygen at the fuel cell, generating an initial amount of electrical energy and generating an initial amount of fuel cell water at the fuel cell cathode 16. This initial amount of fuel cell water is then reclaimed and reacted with the fuel substance 44. Alternately, the process of the invention may be initiated by the permeation of water molecules from the humidity of the atmosphere outside the power generator, through the air inlet 20, and into the power generator. Although less preferred, it is also possible to add an initial amount of non-fuel cell water to the generator, in an amount substantially less than the amount of fuel cell water generated by the fuel cell, to react with the fuel substance 44 and initiate hydrogen gas generation. Such start-up water may be added to the generator, for example, through an opening in the fuel chamber 12, such as entry 46, or through another suitable means, such as through air inlet 20. However, the process and apparatus of the invention are designed to operate without an externally provided water supply, i.e. the system is water-less except for water that is generated by the fuel cell and water molecules present in the atmosphere outside of the power generator. There is no incorporated or connected water supply, such as a water chamber or water reservoir, to provide water for reaction with the hydrogen fuel substance. This results in a significant improvement in the energy density and specific energy of the power generator compared to conventional systems. Accordingly, the present invention provides a continuous, self-regulating process since the hydrogen-oxygen reaction produces exactly the required water corresponding to the electrical power generated, wherein stoichiometric amounts of recycled water and solid fuel are used.

Figure 3A:
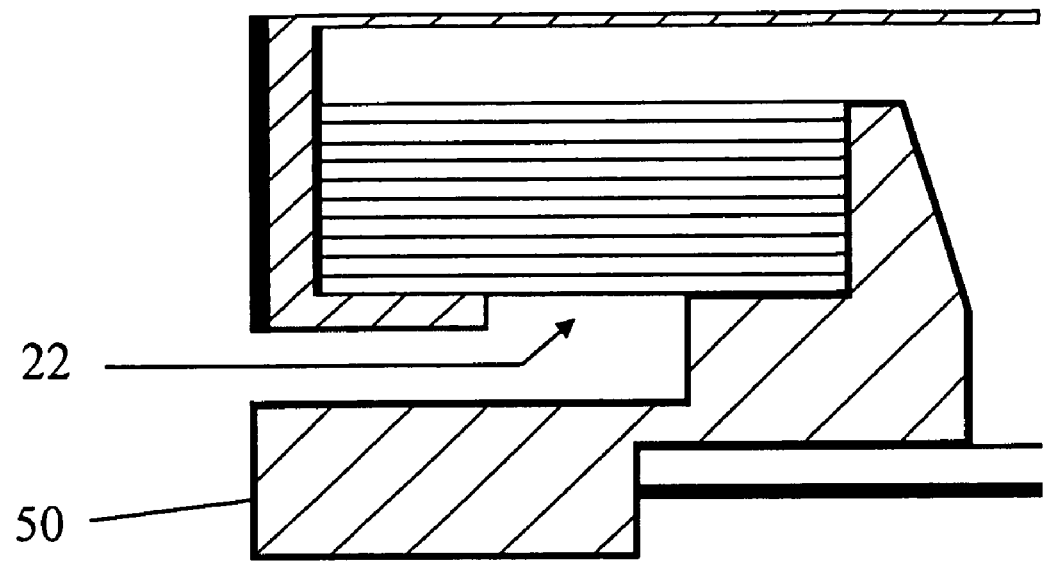
FIG. 3A is a cross-sectional schematic representation of a corner of the power generator illustrated in FIG. 1 illustrating a water retention zone between the air inlet and the fuel cell cathode.
Figure 3B:
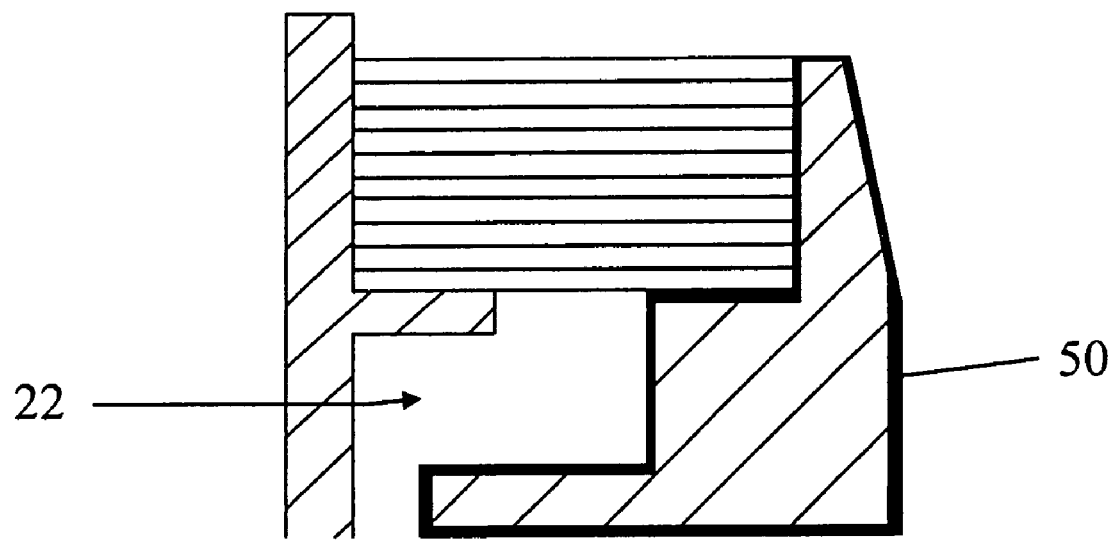
FIG. 3B is a cross-sectional schematic representation of a corner of the power generator illustrated in FIG. 2 illustrating a water retention zone between the air inlet and the fuel cell cathode.

The process of the invention is also preferably passive, running without actively controlled valves or pumps. More particularly, once water is formed as a by-product of the oxygen-hydrogen reaction at the fuel cell 14, the produced water passively diffuses back through the fuel cell 14, into the cavity 24 and to the fuel chamber 12. This passive diffusion is enabled in part due to one or more water retention zones 22, and in part due to the low humidity inside the cavity 24. Water retention zone 22 is highlighted by FIGS. 3A and 3B which offer corner views of the power generators illustrated in FIGS. 1 and 2. As used herein, and as shown in FIGS. 3A and 3B, a water retention zone 22 comprises the channel extending from the air inlet 20 to each the fuel cell cathode 16. A water retention zone 22 is present at each fuel cell 14 which generates fuel cell water. Due to the geometry of the water retention zone 22, diffusive water loss of fuel cell generated water molecules out of the air inlet is deterred, thereby maintaining a high concentration of water vapor at the fuel cell cathode 16. Instead of losing water molecules to the ambient air, water retention zone 22 causes generated water molecules to accumulate at the cathode 16, creating a region of high humidity between the cathode 16 and air inlet 20. This molar flow rate can be described with more specificity via the equation below with reference to FIG. 6:

$$J_A = \frac{D_{AB} * (P_{A1} - P_{A2})}{R * T * (Z_2 - Z_1)}$$

The transport of water vapor from the cathode 16 to the ambient air, and the transport of oxygen from the ambient air to the cathode 16 are both diffusion controlled processes. The molar flux, or molar flow rate, of A is $J_A$, where A is the desired species, i.e. either water or oxygen. The molar flux of water or oxygen is a function of the diffusivity $D_{AB}$, the partial pressure difference between point 1 and point 2 ($P_{A1}-P_{A2}$), the gas constant R, the temperature T in Kelvin, and the distance between points 1 and 2 ($Z_2-Z_1$). Additionally, flux is defined as per area, with units of $$\frac{\text{kg } A}{\text{m}^2 \text{sec}}$$

(kilograms of A, per m² second).

The diffusion coefficient is the proportionality constant between the flux of a species to its concentration gradient. The diffusion coefficient $D_{AB}$ refers to the diffusion coefficient of species A in species B. In the present case, it refers to the diffusion coefficient of water vapor in air, or the diffusion coefficient of oxygen in air. A large diffusion coefficient will yield a large flux value, and a small diffusion coefficient will yield a small flux value. The diffusion coefficient for oxygen in air is about 0.21 cm²/sec at room temperature and normal room humidity, while the diffusion coefficient for water vapor in air at room temperature and humidity is about 0.24 cm²/sec.

Partial pressure is the fraction of the total pressure of a mixture of gases that is due to one component of the mixture. A large partial pressure difference will generate a relatively large flux of the species, while a small partial pressure difference will generate a relatively small flux. The water retention zone is designed to give a small partial pressure difference, e.g. about 10% to about 20% of atmospheric oxygen partial pressure, to obtain the oxygen flux required for the desired power level.

The gas constant is a product of Boltzmann's constant and Avogadro's number. The temperature in Kelvin affects the flux of the species of interest. Higher temperatures tend to reduce flux, while lower temperatures tend to increase flux. Thus, the diffusion of gases, and by extension, their partial pressure differences, can be controlled by adjusting the channel geometry.

Figure 6:
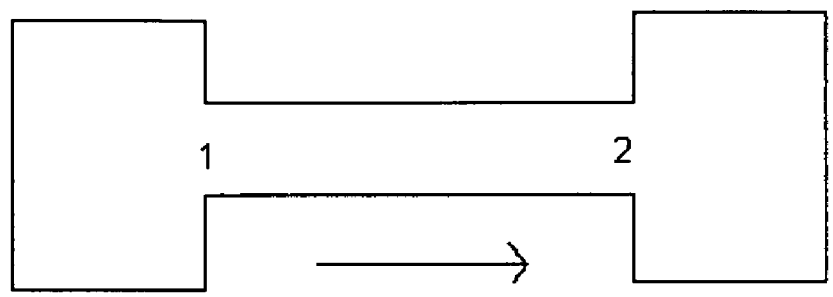
FIG. 6 is a schematic representation of the molar flux of water vapor from one location to another.

With reference to FIG. 6, to control the diffusion of a gas between point 1 and point 2, the geometry of the channel which separates the two points can be changed. For example, if the area of the channel which separates point 1 and point 2 is increased, diffusion between points 1 and 2 is increased, and conversely if the area is decreased, diffusion is reduced. The opposite applies to the distance between point 1 and point 2, whereby increasing the distance between points 1 and 2 results in reduced diffusion, and decreasing the distance between points 1 and 2 results in greater diffusion out of air inlet 20.

The power generators of the invention as seen in FIGS. 1 and 2 are designed to allow enough oxygen to diffuse from the ambient air, through the air inlet 20 and to the cathode 16 with only a small pressure drop, e.g. 10% to 20% of the atmospheric oxygen pressure. The power generator will have high hydrogen permeation losses and thus reduced lifetime if operated at high pressures.

The chemical reaction that converts hydrogen and oxygen to water ($2H_2+O_2 \rightarrow 2H_2O$) creates two moles of water for every mole of oxygen it consumes. Further, the diffusivity of water vapor in air and the diffusivity of oxygen in air are similar. Accordingly, the partial pressure difference of water vapor must be roughly twice that of oxygen to maintain equilibrium. Therefore, the power generator of the invention having the above proportions maintains a humidified environment instead of losing the generated water molecules to the atmosphere outside the generator.

Within the cavity 24, on the anode 18 side of the fuel cell 14, a comparatively low humidity region exists due to the moisture absorbing, hygroscopic nature of the fuel substance 44. Accordingly, the water generation and retention at the cathode 16 generates a moisture concentration gradient and a gas pressure differential which causes water molecules to diffuse back through the fuel cell 14, into the cavity 24 and to the fuel chamber 12 in the form of water vapor. This water vapor then reacts with fuel substance 44, generating hydrogen gas. The generated hydrogen gas will then pass through cavity 24 and to the fuel cell anode 18 where it will react with oxygen to once again generate water molecules. This cycle may optionally continue until all of the fuel substance 44 is consumed.

During operation of the power generator, more generated water vapor will diffuse back into the cavity than is lost out of the air inlet. Furthermore, fuel cell output is directly dependent on the flow of oxygen and hydrogen reactants to the fuel cells, and hence the flow of water vapor the fuel chamber. Accordingly, fuel cell output is proportional to the ratio of the area of the water retention zone to its length. In the preferred embodiment of the invention, the ratio of zone area to zone length per unit of power is preferably from about 0.01 cm/mW to about 0.05 cm/mW of power output for a single fuel cell. If multiple fuel cells are incorporated, this ratio of zone area to zone length per unit of power is divided by the number of fuel cells which share the reactants.

The generator will operate at reduced power if the geometry of the water retention zone 22 is too restrictive to allow sufficient oxygen to diffuse to the fuel cells 14. Particularly, at a zone area to length ratio of greater than 0.05 cm$^2$ area/1 cm length, excess water vapor will diffuse out of the air inlet, and at a zone area to length ratio of less than 0.01 cm$^2$ area/1 cm length, not enough oxygen will reach the fuel cells to operate at a high efficiency. The same is true for the geometry of the cavity within the housing extending from the fuel cell to the fuel chamber, which admits a flow of hydrogen gas from the fuel chamber to the fuel cell, and which admits a flow of water vapor from the fuel cell to the fuel chamber.

In another embodiment, the power generator 10 may further include at least one valve 26 for regulating the flow hydrogen gas from the fuel chamber 12 to the fuel cell 14, and for regulating the passage of water vapor from the fuel cell 14 to the fuel chamber 12. As shown in FIGS. 1 and 2, valve 26 is positioned within the cavity 24 between fuel chamber 12 and the fuel cell 14. In the preferred embodiment of the invention, valve 26 comprises a pneumatic valve that is controlled by gas pressure within said cavity 24, pneumatically adjusting the conductance of water vapor to the fuel chamber 12. Valve 26 preferably comprises a pneumatically actuated flexible diaphragm 30 having a periphery that is preferably fixed to the power generator housing 36 at a support 50; a valve disc 28 positioned opposite the diaphragm 30; and a rod connector joins the valve disc 28 and diaphragm 30. The valve 26 is in a closed position when the valve disc 28 is in contact with a seal 38, preventing water vapor from reaching the fuel chamber 12. Alternately, the valve is in an open position when the valve disc is separated from seal 38, allowing water vapor to reach the fuel chamber 12 and allowing generated hydrogen gas to reach the fuel cells 14. Preferably, seal 38 comprises a portion of housing 36. Support 50 also preferably comprises part of housing 36. As seen in FIGS. 1 and 2, the fuel cell or fuel cells 14 are also preferably mounted inside the housing by support 50.

The dimensions of the component parts of the valve are preferably very small in scale but may vary with respect to the particular application of the valve. The diaphragm thickness and diameter should be within a certain range depending on the desired power output. In the preferred embodiment of the invention, the diaphragm 30 is either tensile or non-tensile and preferably comprises a thin circular plate preferably having a diameter of from about 1 cm to about 3 cm, more preferably from about 1 cm to about 2 cm. The valve disc 28 preferably has a diameter of from about 0.2 to about 1 cm, more preferably from about 0.2 cm to about 0.5 cm. In the preferred embodiment of the invention, the rod connector may comprise a screw or a bolt, but any other means of connecting the diaphragm 30 to the valve disc 28 is suitable such that the valve can alternate between the open and closed positions.

The actuation of the valve is preferably controlled by the internal gas pressure exerted on the diaphragm 30. As the internal gas pressure of the apparatus rises due to the generation of hydrogen gas, the diaphragm 30 will bend or push outward slightly. This causes the connector to pull the valve disc 28 against the seal 38, closing the valve and preventing the flow of additional water vapor to the fuel chamber 12. With the valve closed, hydrogen production ceases. This also prevents the internal gas pressure from rising further. As hydrogen is consumed, such as by fuel cells 14, the internal gas pressure drops, allowing the valve disc 28 to disengage the seal 38 and opening the valve. Accordingly, hydrogen gas is automatically produced at the rate at which it is consumed.

In the preferred embodiment of the invention, the power generator 10 operates by maintaining a fixed pressure, via the pneumatic valve 26. The power generator 10 should be able to operate down to low ambient pressures at reduced power output, and up to theoretically unlimited ambient pressures at full power output. In the preferred embodiment of the invention, the internal $H_2$ pressure of the apparatus when in the closed position is from about 0 kPa to about 1000 kPa. The valve will be fully shut when no hydrogen gas is used by the fuel cell, and will open the amount required to meet consumption rate of the hydrogen gas. In the most preferred embodiment of the invention, the internal pressure of the power generator is maintained at about 100 kPa at all times, wherein when the pressure drops below about 10 kPa, the valve will open slightly until the internal pressure raises to at or above about 500 kPa, causing the valve to close. The most preferred operating pressures are preferably from about 0.5 atm (about 50 kPa) to about 2 atm (about 202 kPa) for small scale applications such as portable electronic devices or wireless sensors.

In general, the power generator 10 operates by maintaining a fixed pressure, usually a few psi over ambient, using the pneumatic valve 26. Preferably, generator 10 is able to operate down to low ambient pressures at reduced power output, and up to theoretically unlimited ambient pressures at full power output. The power generator 10 is preferably maintained at an operating temperature of from about −40° C. to about 85° C., more preferably from about −20° C. to about 50° C., more preferably from about 0° C. to about 50° C. and most preferably from about 20° C. to about 50° C. while in use.

For the purposes of this invention, the term "water vapor" does not include steam. While "water vapor" and "steam" are both forms of water, each has very different properties and uses. For example, a locomotive can be driven by steam, but will not operate on the water vapor present in humid air, as does the present invention. In and of itself, "water vapor" is the gas of individual water molecules that may form naturally over a body of water at any temperature, including ice, or that may be naturally present in ambient air. It has a low partial pressure, so it contains relatively few water molecules unless the water that forms it is heated. On the other hand, "steam" is made up of tiny hot water droplets produced by heating water to boiling. Steam contains about 100× more water molecules than does water vapor at 15° C., naturally expands with high force and velocity, and large amounts of water can be boiled and transported off as steam. Water vapor is present in everyday air and contains a much smaller number of water molecules than steam or liquid water, and moves very slowly by natural diffusion. Only very small amounts of water can be transported in the form of water vapor. To illustrate, a single drop of water takes typically one hour to evaporate at room temperature, while an entire kettle of water can be boiled into steam in about twenty minutes. Further, a steam powered generator would require a water supply or water source from which steam may be generated. In contrast, the present invention provides an improvement upon the related art by eliminating such a water source. Accordingly, the apparatus and process of the present invention are designed to function at low operating temperatures using water vapor, not at high operation temperatures using steam.

As seen in FIGS. 1 and 2, the power generator 10 may further include a restriction 32 united with the air inlet 20, regulating the diffusion of atmospheric oxygen and atmospheric water molecules into the power generator. This restriction also aids in raising the humidity at the fuel cell cathode 16 due to impedance presented to outward diffusion of water vapor produced at the cathode 16. This increased humidity improves the operation of the fuel cell. The restriction preferably comprises a hydrophobic membrane that is substantially permeable to atmospheric oxygen gas, but substantially impermeable to water vapor, which membrane substantially obstructs the flow of fuel cell water into the atmosphere. Suitable materials for this oxygen permeable, water vapor impermeable membrane having the desired properties include fluoropolymer containing materials such as fluorinated ethylene propylene (FEP), perfluoroalkoxy, and non-fluoropolymer containing materials such as oriented polypropylene (OPP), low density polyethylene (LDPE), high density polyethylene (HDPE) and cyclic olefin copolymers (COCs). The most preferred oxygen permeable, water vapor impermeable membrane material comprises fluorinated ethylene propylene. In addition, for some embodiments, the membrane alone may not allow sufficient oxygen permeation to the cathode. Accordingly, a small opening 48 (see FIG. 2) in the restriction 32 may be provided to allow the ingress of extra atmospheric oxygen and atmospheric water molecules into the cavity to diffuse to the fuel cell cathode or cathodes. However, this opening may also cause some of the water vapor to diffuse out of the power generator 10. The required opening size is a function of the power level, the diffusion path length, and the desired partial pressure drop. The size of this opening is preferably very small in size and may preferably comprise from about 0.001% to about 1% of the entire surface area of the membrane.

The substantially non-fluid substance within the fuel chamber 12 preferably comprises a material in powder, granule or pellet form and is preferably an alkali metal, calcium hydride, lithium hydride, lithium aluminum hydride, lithium borohydride, sodium borohydride and combinations thereof. Suitable alkali metals non-exclusively include lithium, sodium and potassium. The preferred material for the non-fluid substance is lithium aluminum hydride. The fuel substance is preferably a solid, porous material that allows for the diffusion of gases and vapors. Further, the non-fluid substance is also preferably combined with a hydrogen generation catalyst to catalyze the reaction of the water vapor and the non-fluid substance. Suitable catalysts include non-exclusively include cobalt, nickel, ruthenium, magnesium and alloys and combinations thereof.

As seen in FIGS. 1 and 2, fuel chamber 12 is preferably bordered by porous vapor membrane 34. This membrane 34, attached to the housing 36 and juxtaposed with the fuel chamber 12, is necessarily permeable to water vapor, so as to allow water vapor to pass into the fuel chamber 12 and react with the solid fuel substance, thereby generating hydrogen gas. It is also necessarily permeable to hydrogen gas, so as to allow generated hydrogen gas to pass into the cavity 24 and back to the fuel cell 14. Suitable materials for this vapor membrane 34 having such dual properties non-exclusively include porous polymers including fluoropolymers, including expanded-polytetrafluoroethylene (ePTFE) laminates such as expanded Teflon®. Particularly preferred ePTFE laminates are GORE-TEX® manufactured by W. L. Gore & Associates, Inc. of Delaware, and eVENT®, manufactured by BHA technologies of Delaware.

Referring to FIG. 2, in particular, is a cross-sectional schematic representation of an alternate power generator of the invention having an air inlet with a larger surface area compared to the generator of FIG. 1. Similarly, in this embodiment, a hydrophobic membrane 32 that is substantially permeable to atmospheric oxygen gas, but substantially impermeable to water vapor, is preferably placed at air inlet 20. However, in order to allow for the intake of water molecules from natural air humidity in the atmosphere, a small opening 48 (e.g. about 0.008 cm$^2$) opening is preferably cut into the membrane 32. This opening 48 will also allow extra oxygen to diffuse to the fuel cell cathodes. In the preferred embodiment of the invention, the power generators of the invention will perform best when in an environment having a relative humidity of at least about 5%, wherein the performance will improve with increasing humidity.

The embodiment of FIG. 2 also preferably includes a pneumatic valve 26 which preferably includes a mesh diaphragm 30 and a water permeable, hydrogen impermeable membrane 40 in juxtaposition with the mesh diaphragm 30 of the valve 26. The mesh diaphragm 30 is preferably permeable to water vapor and is preferably formed from a polymeric material, such as polyethylene terephthalate or a metal such as stainless steel. Suitable water permeable materials for this water permeable membrane 40 include perfluorinated polymers such as perfluorosulfonate ionomers. Also suitable are epoxides and chloroprene rubber. Most preferably, the water permeable membrane comprises a perfluorosulfonate ionomer membrane commercially available under the trademark Nafion® from EI DuPont de Nemours & Co. of Delaware. Nafion® is preferred because it has a fluorinated backbone that makes it very stable, with sulfonic acid side chains to support high ionic conductivity. The water permeable, hydrogen impermeable membrane 40 allows the diffusion of water vapor to the fuel chamber 12 without passing the water vapor through the electrolytic membrane 42. It provides a large area path for water vapor to permeate into the fuel chamber and may allow the fuel cells 14 to operate at higher current densities than if the water is recovered solely though the fuel cells themselves. A similar material forms the electrolytic membrane 42 of the at least one fuel cell 14.

Accordingly, as can from FIG. 2, this power generator 10 provides dual avenues for the transport of fuel cell generated water molecules from the fuel cell cathode 16 to the fuel chamber 12. Specifically, in the embodiment of FIG. 2, the reaction of hydrogen gas and atmospheric oxygen in the fuel cell 14 results in the generation of fuel cell water at the fuel cell cathode 16, and thereby generates electricity. This generated fuel cell water is retained in the water retention zone 22 and may re-enter cavity 24 by either diffusing back through the fuel cell 14, or by diffusing from the water retention zone 22 and permeating through the mesh diaphragm 30 and water permeable membrane 40.

Figure 7:
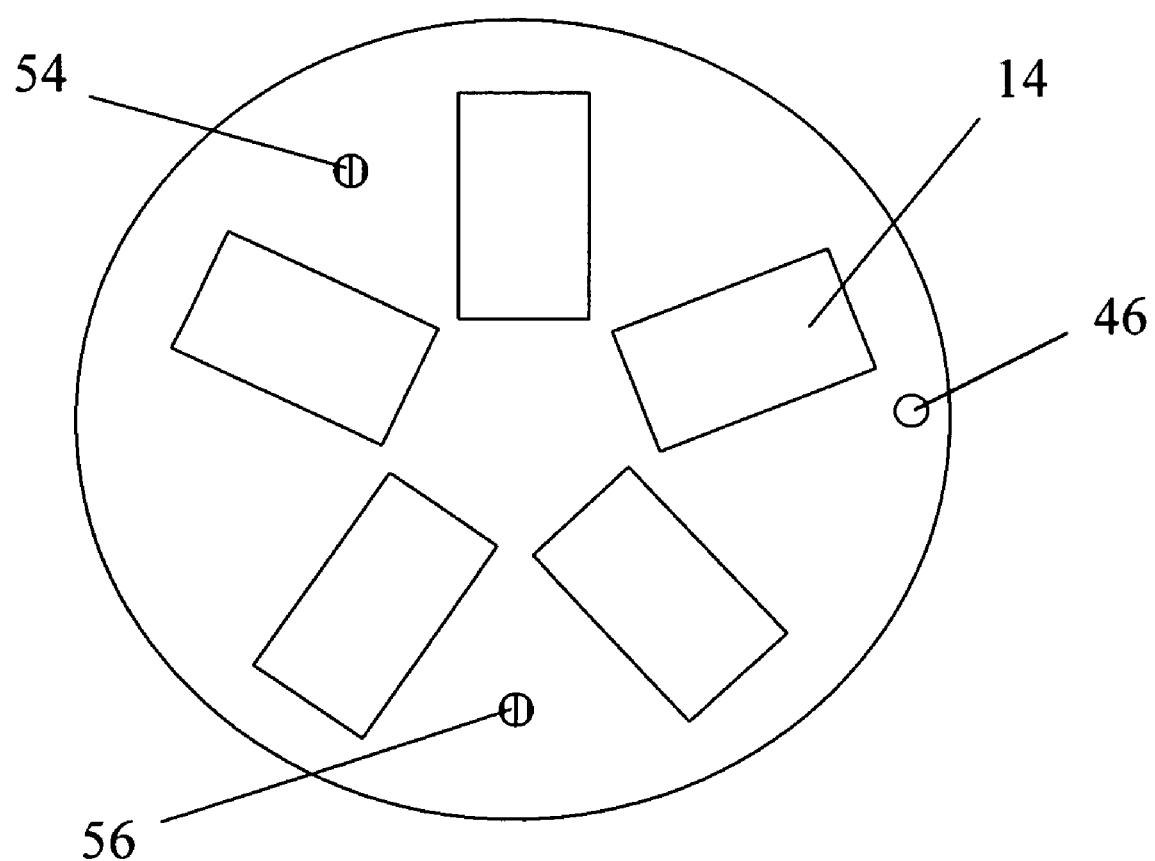
FIG. 7 is a top-view of a cylindrical power generator of the invention incorporating a plurality of fuel cells.

Illustrated in FIG. 7 is a top view of a cylindrical power generator 10 of the invention having a plurality of fuel cells. As seen in FIG. 7, in a preferred embodiment, a plurality of fuel cells 14 are positioned around a circumference of the power generator 10. A power generator 10 of the invention may also include an entry 46, through which fuel substance 44 may optionally be replenished. Alternately, when fuel substance 44 is consumed, the power generator may be disposed, similar to a battery. Each of the assembled component parts of the power generator 10 may further be enclosed in a suitable hollow structure such as a tube formed from a suitable material, such as polyethylene terephthalate (not shown), which enclosure may also be capped on the top and/or bottom surfaces with a suitable cap (not shown), which cap may be removable and is preferably formed of a similar or different material as the enclosure. The power generator 10 also further preferably includes at least one electrical connector through which a device may be electrically connected to the power generator 10. As illustrated in FIG. 1, in the preferred embodiment of the invention, a device 52 (schematically represented, not drawn to scale) is preferably electrically connected to the power generator 10 through electrical connectors 54 and 56, which electrical connectors 54 and 56 are preferably connected to the cathode(s) and anode(s) of the fuel cell(s). Electrical connectors 54 and 56 are also illustrated in FIG. 7. In embodiments incorporating a plurality of fuel cells, the plurality of fuel cells are preferably connected in series, and are preferably connected to a single set of electrical connectors 54 and 56 protruding from the generator housing 36. In a preferred embodiment of the invention, the power generator 10 includes eight interconnected fuel cells.

Each of the parts of the power generator 10 and the valve 26 may be fabricated of a suitable polymeric material, a metal or other material as determined by the requirements of the intended use of the generator and valve. A preferred material non-exclusively includes polyethylene terephthalate. The preferred dimensions of the component parts of the power generator 10 are preferably very small in scale, but may also vary with respect to the use of the power generator 10. The preferred outer dimensions of such a waterless, micro-power generator are from about 1 mm to about 100 mm in length, from about 1 mm to about 100 mm in width, and from about 1 to about 100 mm in depth, more preferably from about 1 mm to about 25 mm in length, from about 1 mm to about 25 mm in width, and from about 1 to about 25 mm in depth. Such a waterless, micro-power generator is capable of incorporating one or more fuel cells 14 which fuel cells may range in size from about 0.1 mm$^2$ to about 5,000 mm$^2$. A waterless, micro-power generator of the invention is also preferably capable of containing a volume capacity of from about 0.1 mm$^3$ to about 15,625 cm$^3$. A larger power generator may preferably have dimensions of up to at least about 50 cm or more in length, width and depth, up to at least about 5000 cm$^2$ or more in fuel cell area and up to at least about 0.125 m$^3$ or more in power generator volume. While these dimensions are preferred, they may vary widely and are not intended to be limiting. The dimensions of each of the component parts of the power generator may similarly vary as could be determined by one skilled in the art in such a manner that the power generator of the invention will operate as intended.

Figure 5:
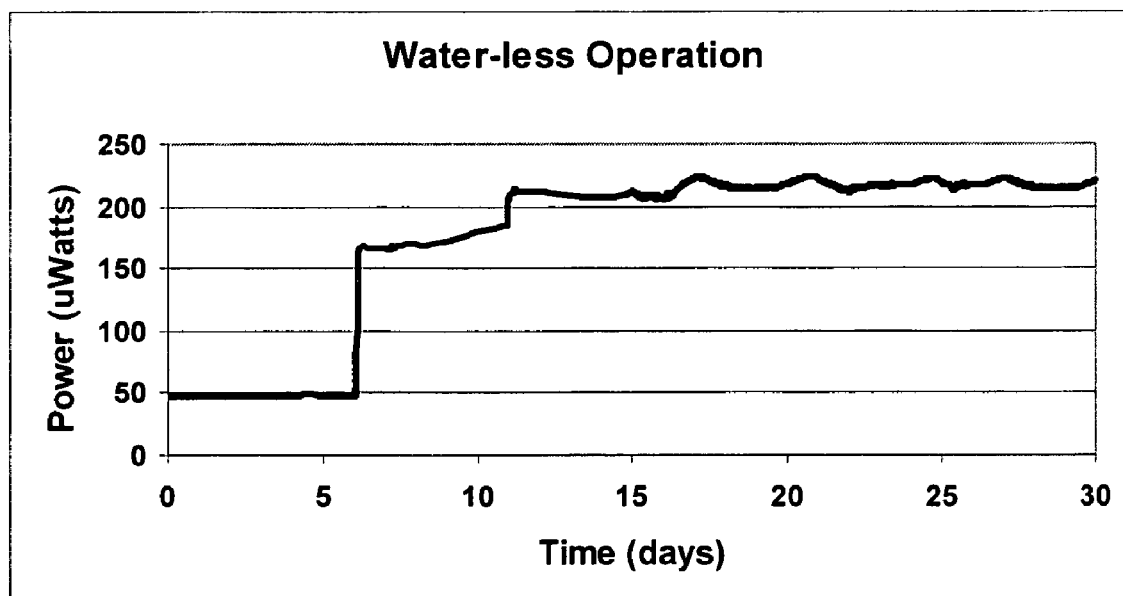
FIG. 5 is a plot of power output versus time for a power generator of the invention.

Each of the embodiments illustrated in FIGS. 1 and 2 have been found to exhibit electrical conductivity in the absence of a provided, non-fuel cell water source. FIG. 5 and Example 1 below offer an example of the power output vs. time plot for a small-scale, micro-power generator of the invention. A micro-power generator of the invention preferably produces a power output of from about 1 micro Watt to about 100 milli Watts, more preferably from about 1 micro Watt to about 1000 milli Watts, and energy densities of from about 0.1 W-hr/cc to about 10 W-hr/cc. Larger power generators of the invention may produce power output levels of from about 0.1 W to about 100 W and energy densities of from about 0.1 W-hr/cc to about 10 W-hr/cc.

It should be further understood that while the exemplified embodiments of FIGS. 1 and 2 represent preferred power generator apparatuses of the invention, such structures are not intended to be limiting. Other design variations that perform in a substantially similar manner, i.e. waterless power generators capable of producing useful levels of electricity with hydrogen-oxygen fuel cells including a solid fuel substance, are incorporated within the scope of the invention.

The following examples serve to illustrate the invention:

EXAMPLE 1

A power generator as seen in FIG. 1 was provided and given an initial flush of hydrogen gas. The initial flush evacuated air from the generator cavity, and was thereafter consumed by the fuel cell, producing electricity and byproduct water. Following consumption of this initial hydrogen flush, hydrogen gas was continuously generated internally, as well as electricity. The power output of the generator was measured over time. The results are shown in FIG. 5, which is a plot of the power output of the power generator versus time. Power output was initially set at 50 micro Watts, but was later increased to 170 and then to 210 micro Watts, where it was maintained for the duration of a 30 day test. During the first 20 days of the test, ambient laboratory air relative humidity varied between about 10 to 20 percent. Laboratory air temperature was about 23° C. The initial flush of hydrogen was estimated to have been consumed in about the first day of operation. For this waterless operation, the required water is back-permeating through the fuel cells themselves. Internal gas pressure was stable over a range of operating power levels, and the amount of cathodic water was exactly the right amount at any power level. The possible net gains from water recycling are an approximate 2× reduction in system volume and weight, reduced cost and complexity, and greater safety, due to the elimination of liquid water that must be loaded. Better hydration of the PEM is also achieved due to the humidity of the air over the cathodes.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An electrical power generator comprising:
   a) a housing;
   b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas;
   c) at least one fuel chamber mounted within the housing, which fuel chamber contains a fuel substance which reacts with water vapor to generate hydrogen gas;
   d) at least one air inlet for admitting atmospheric air into the housing;
   e) a water retention zone within the housing extending from the air inlet to the fuel cell cathode, which water retention zone deters the diffusion of generated fuel cell water out of the air inlet; and
   f) a cavity within the housing extending from the fuel cell to the fuel chamber, which admits a flow of hydrogen gas from the fuel chamber to the fuel cell, and which admits a flow of water vapor from the fuel cell to the fuel chamber;
   such that the power generator is waterless except for water that is generated by the fuel cell and water molecules present in the atmosphere outside of the power generator and there is no incorporated or connected water supply, water chamber, or water reservoir, to provide water for reaction with the hydrogen fuel substance.

2. The power generator of claim 1 wherein said fuel substance comprises a solid material selected from the group consisting of alkali metals, calcium hydride, lithium hydride, lithium aluminum hydride, lithium borohydride, sodium borohydride and combinations thereof.

3. The power generator of claim 1 wherein said fuel substance comprises lithium aluminum hydride.

4. The power generator of claim 1 further comprising a porous vapor membrane attached to said housing and juxtaposed with the fuel chamber, which membrane is permeable to both hydrogen gas and water vapor.

5. The power generator of claim 4 wherein said porous vapor membrane comprises a fluoropolymer.

6. The power generator of claim 1 further comprising at least one valve positioned in said cavity for regulating the passage of hydrogen gas from the fuel chamber to the fuel cell, and for regulating the passage of water vapor from the fuel cell to the fuel chamber.

7. The power generator of claim 6 wherein said valve comprises a pneumatic valve, which pneumatic valve is controlled by gas pressure within said cavity.

8. The power generator of claim 1 further comprising at least one device electrically connected to said anode and cathode of the at least one fuel cell, which device is powered by electricity produced by said fuel cell.

9. The power generator of claim 1 which produces from about 1 micro Watt to about 100 milli Watts of electricity.

10. The power generator of claim 1 further comprising an oxygen permeable, water vapor impermeable membrane united with the air inlet, which membrane deters the flow of fuel cell water into the atmosphere.

11. The power generator of claim 10 wherein said oxygen permeable, water vapor impermeable membrane comprises a fluorinated ethylene propylene polymer or a perfluoroalkoxy polymer.

12. The power generator of claim 10 further comprising an opening within said oxygen permeable, water vapor impermeable membrane.

13. The power generator of claim 1 further comprising a catalyst combined with said fuel substance.

14. An electrical power generator comprising:
   a) a housing;
   b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas;
   c) at least one fuel chamber mounted within the housing, which fuel chamber contains a fuel substance which reacts with water vapor to generate hydrogen gas;
   d) at least one air inlet for admitting atmospheric air into the housing;
   e) a water retention zone within the housing extending from the air inlet to the fuel cell cathode, which water retention zone deters the diffusion of generated fuel cell water out of the air inlet;
   f) a cavity within the housing extending from the fuel cell to the fuel chamber, which admits a flow of hydrogen gas from the fuel chamber to the fuel cell, and which admits a flow of water vapor from the fuel cell to the fuel chamber;
   g) at least one valve positioned within said cavity for regulating the passage of hydrogen gas from the fuel chamber to the fuel cell, and for regulating the passage of water vapor from the fuel cell to the fuel chamber;
   h) an oxygen permeable, water vapor impermeable membrane united with the air inlet, which membrane deters the flow of fuel cell water into the atmosphere; and
   i) a water permeable, hydrogen impermeable membrane within the cavity and juxtaposed with said valve, which water permeable, hydrogen impermeable membrane allows the diffusion of water vapor to said fuel chamber without passing the water vapor through said electrolytic membrane;

such that the power generator is waterless except for water that is generated by the fuel cell and water molecules present in the atmosphere outside of the power generator and there is no incorporated or connected water supply, water chamber, or water reservoir, to provide water for reaction with the hydrogen fuel substance.

15. The power generator of claim 14 wherein said fuel substance comprises a solid material selected from the group consisting of alkali metals, calcium hydride, lithium hydride, lithium aluminum hydride, lithium borohydride, sodium borohydride and combinations thereof.

16. The power generator of claim 14 wherein said fuel substance comprises lithium aluminum hydride.

17. The power generator of claim 14 further comprising a porous vapor membrane attached to said housing and juxtaposed with the fuel chamber, which membrane is permeable to both hydrogen gas and water vapor.

18. The power generator of claim 17 wherein said porous vapor membrane comprises a fluoropolymer.

19. The power generator of claim 14 wherein said valve comprises a pneumatic valve, which pneumatic valve is controlled by gas pressure within said cavity.

20. The power generator of claim 14 wherein said water permeable, hydrogen impermeable membrane comprises a perfluorinated polymer.

21. The power generator of claim 14 further comprising at least one device electrically connected to said anode and cathode of the at least one fuel cell, which device is powered by electricity produced by said fuel cell.

22. The power generator of claim 14 which produces from about 1 micro Watt to about 100 milli Watts of electricity.

23. The power generator of claim 14 wherein said oxygen permeable, water vapor impermeable membrane has an opening therein.

24. The power generator of claim 23 wherein said oxygen permeable, water vapor impermeable membrane comprises a fluorinated ethylene propylene polymer or a perfluoroalkoxy polymer.

25. The power generator of claim 14 further comprising a hydrogen generation catalyst combined with said fuel substance.

26. A process for producing electrical power comprising:
I) providing an electrical power generator which comprises:
 a) a housing;
 b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas;
 c) at least one fuel chamber mounted within the housing, which fuel chamber contains a fuel substance which reacts with water vapor to generate hydrogen gas;
 d) at least one air inlet for admitting atmospheric air into the housing;
 e) a water retention zone within the housing extending from the air inlet to the fuel cell cathode, which water retention zone deters the diffusion of generated fuel cell water out of the air inlet; and
 f) a cavity within the housing extending from the fuel cell to the fuel chamber, which admits a flow of hydrogen gas from the fuel chamber to the fuel cell, and which admits a flow of water vapor from the fuel cell to the fuel chamber; and
II) operating said power generator to generate electricity by:
 a) reacting hydrogen gas and atmospheric oxygen gas in the fuel cell, thereby generating fuel cell water and electricity, which fuel cell water is retained in the water retention zone;
 b) diffusing said fuel cell water from the water retention zone, through the electrolytic membrane, into the cavity and to the at least one fuel chamber;
 c) reacting the water vapor with the fuel substance to generate hydrogen gas;
 d) diffusing the generated hydrogen gas through the cavity and to the fuel cell; and
 e) operating said power generator by using only water that is generated by the fuel cell and water molecules present in the atmosphere outside of the power generator to provide water for reaction with the hydrogen fuel substance and having no water provided for reaction with the hydrogen fuel substance generated by an incorporated or connected water supply, water chamber, or water reservoir.

27. The process of claim 26 wherein said power generator is maintained at an operating temperature of from about −40° C. to about 85° C. during step II).

28. The process of claim 26 further comprising regulating the passage of hydrogen gas from the fuel chamber to the fuel cell, and regulating the passage of water vapor from the fuel cell to the fuel chamber with at least one valve.

29. The process of claim 28 wherein the valve comprises a pneumatic valve.

30. The process of claim 28 wherein the power generator further comprises a water permeable, hydrogen impermeable membrane within the cavity and juxtaposed with said valve, and wherein water vapor diffuses into said cavity through the water permeable, hydrogen impermeable membrane and wherein water vapor diffuses into the cavity through the electrolytic membrane of said fuel cell.

31. The process of claim 26 wherein said oxygen permeable, water vapor impermeable membrane has an opening therein.

32. The process of claim 26 further comprising flushing an initial amount of hydrogen gas into said cavity for generating an initial amount of fuel cell electricity.

33. The process of claim 26 further comprising powering at least one device with electricity produced by said at least one fuel cell, the at least one device being electrically connected to said anode and cathode of the at least one fuel cell.

34. The process of claim 26 which produces from about 1 micro Watt to about 100 milli Watts of electricity.

35. The process of claim 26 wherein II) is repeated continuously.

* * * * *